(12) United States Patent
Crisp et al.

(10) Patent No.: US 9,366,217 B2
(45) Date of Patent: Jun. 14, 2016

(54) SYSTEM AND METHOD FOR CONTROLLING ENGINE RESTART OPERATION TO REDUCE RESONANCE

(75) Inventors: Nicholas Dashwood Crisp, Leigh-on-Sea (GB); Mark Richard Skilling, Tonbridge (GB); Chris Connelly, Leaden Roding (GB)

(73) Assignee: Ford Global Technologies, LLC, Dearborn, MI (US)

( * ) Notice: Subject to any disclaimer, the term of this patent is extended or adjusted under 35 U.S.C. 154(b) by 653 days.

(21) Appl. No.: 13/419,149

(22) Filed: Mar. 13, 2012

(65) Prior Publication Data

US 2012/0247414 A1    Oct. 4, 2012

(30) Foreign Application Priority Data

Mar. 31, 2011    (GB) .................................. 1105465.7

(51) Int. Cl.
| | |
|---|---|
| *B60W 10/02* | (2006.01) |
| *F02N 11/08* | (2006.01) |
| *F02N 19/00* | (2010.01) |
| *B60W 10/06* | (2006.01) |
| *B60W 10/30* | (2006.01) |

(Continued)

(52) U.S. Cl.
CPC ............ *F02N 11/0844* (2013.01); *B60W 10/06* (2013.01); *B60W 10/30* (2013.01); *B60W 30/18018* (2013.01); *B60W 30/20* (2013.01); *F02N 19/00* (2013.01); *B60W 2510/0638* (2013.01); *B60W 2710/0605* (2013.01); *B60W 2710/305* (2013.01); *F02N 11/0855* (2013.01); *F02N 2200/022* (2013.01); *Y02T 10/48* (2013.01)

(58) Field of Classification Search
CPC .......... F02N 11/0844; F02N 2200/022; Y02T 10/48; F02D 2041/2044; F02D 2041/286; F02D 41/0097; B60W 10/30; B60W 30/18018; B60W 30/20
USPC ............... 123/179.4, 179.28, 339.16, 339.17, 123/339.18; 701/110, 112, 113
See application file for complete search history.

(56) References Cited

U.S. PATENT DOCUMENTS

| | | | |
|---|---|---|---|
| 3,815,562 A | * | 6/1974 | Showalter et al. ............. 123/442 |
| 4,070,585 A | | 1/1978 | Parkyn |

(Continued)

FOREIGN PATENT DOCUMENTS

| | | |
|---|---|---|
| CN | 1696483 A | 11/2005 |
| CN | 102575631 A | 7/2012 |

(Continued)

OTHER PUBLICATIONS

Partial Translation of Office Action of Chinese Application No. 2012100924509, Issued Jul. 2, 2015, State Intellectual Property Office of PRC, 9 Pages.

(Continued)

*Primary Examiner* — Hai Huynh
*Assistant Examiner* — Gonzalo Laguarda
(74) *Attorney, Agent, or Firm* — Juila Voutyras; Alleman Hall McCoy Russell & Tuttle LLP

(57) ABSTRACT

A method and system for dealing with a change of mind event during an automatic shut-down of an engine 6 having a dual mass flywheel 8 is provided that reduces or eliminates the risk of excessive dual mass resonance during a restart of the engine 6 is disclosed.

15 Claims, 3 Drawing Sheets

(51) Int. Cl.
*B60W 30/18* (2012.01)
*B60W 30/20* (2006.01)

(56) References Cited

U.S. PATENT DOCUMENTS

| | | | | |
|---|---|---|---|---|
| 7,933,711 | B1* | 4/2011 | Ulrey | F02D 41/008 123/179.16 |
| 8,036,815 | B2* | 10/2011 | Okumoto et al. | 701/110 |
| 9,074,573 | B2* | 7/2015 | Notani | F02N 11/0844 |
| 2003/0089326 | A1 | 5/2003 | Ujifusa | |
| 2009/0271057 | A1 | 10/2009 | Stone | |
| 2010/0050970 | A1* | 3/2010 | Okumoto | F02N 11/0844 123/179.4 |
| 2012/0259535 | A1* | 10/2012 | Jaros et al. | 701/113 |
| 2014/0309851 | A1* | 10/2014 | Felber et al. | 701/33.9 |
| 2016/0046282 | A1* | 2/2016 | Yamazaki | B60W 20/40 477/5 |

FOREIGN PATENT DOCUMENTS

| | | |
|---|---|---|
| EP | 2230393 A2 | 9/2010 |
| FR | 2688548 A1 | 9/1993 |
| GB | 2435302 A | 8/2007 |
| JP | 7158543 A | 6/1995 |
| JP | 2005069206 A | 3/2005 |
| JP | 2010077904 A | 4/2010 |
| JP | 2010242563 A | 10/2010 |
| KR | 20070103193 A | 10/2007 |
| TW | I288206 B | 10/2007 |
| WO | WO 2011047916 A1 * | 4/2011 |

OTHER PUBLICATIONS

Partial Translation of Office Action of Chinese Application No. 2012100924509, Issued Feb. 15, 2016, State Intellectual Property Office of PRC, 8 Pages.

* cited by examiner

SYSTEM AND METHOD FOR CONTROLLING ENGINE RESTART OPERATION TO REDUCE RESONANCE

CROSS-REFERENCE TO RELATED APPLICATIONS

This application claims priority to United Kingdom Patent Application Number 1105465.7, titled "A METHOD AND SYSTEM FOR CONTROLLING AN ENGINE" and filed on Mar. 31, 2011, the entire disclosure of which is hereby incorporated by reference for all purposes.

FIELD

The present description relates to the automatic stopping and starting of an internal combustion engine and in particular to the restarting of such an engine due to a change of mind event following an engine shut down request.

BACKGROUND AND SUMMARY

It is a particular problem for an engine fitted with dual mass flywheel that it is subject to resonance of the dual mass flywheel at low engine speeds in what is known as a dual mass flywheel (DMF) resonance region. This resonance is a significant issue during the run-up and shut-down of the engine and particularly when the engine has to be re-started once it has begun to shut-down, a so called 'Change of Mind Event' (COM) as may occur if the engine is fitted with an automatic start and stop system. The line 4 on FIG. 3 shows the possible effect of attempting a restart during the resonance region and the large fluctuations of engine speed that can occur.

During the shutdown of the engine a throttle valve is generally closed to enable fast shutdown of the engine due to the effect of the low pressure (vacuum) in the inlet manifold. However, when the engine is restarted, a high manifold pressure is required and so the throttle valve needs to be open.

A conventional restart procedure enables and/or reactivates the fuelling and spark as soon as possible after the COM and this will result in a lower than optimal torque from the engine due to the low manifold pressure and may also be attempting the restart within the resonance region of the flywheel, causing severe oscillations of engine speed and possibly the inability to accelerate the engine speed above the resonance region.

An engine with a conventional restart strategy and a conventional starter motor which cannot be engaged while the engine is still turning has to avoid the DMF resonance region due to high noise and possible damage to the DMF that can result.

A strategy described herein that is employed to prevent the occurrence of such resonance either restarts the engine before the DMF region is reached (Option 1) (Line 1 on FIGS. 3 and 1' on FIG. 4) or waits until the engine has definitely stopped (Option 2) (Lines 2 and 3 on FIG. 3 and lines 2' and 3' on FIG. 4).

Option 1 is only applicable if the COM happens early in the shut-down cycle before the speed falls into the resonance region and the engine is then restarted without the use of a starter motor by providing fuel and spark to the engine in the case of an S.I. Engine and using the existing rotational speed/inertia to start the engine. This has the disadvantage that there is only a small window of opportunity to employ such a technique and so generally Option 2 described below may be used for the majority of restarts.

In the case of Option 2 the engine has to completely stop as indicated by Line 2 before it can be restarted. This is because a conventional starter motor cannot be engaged with a moving flywheel without causing damage. Once the engine has stopped the starter motor is engaged to restart the engine (Line 3 on FIG. 3). This approach adds considerable time to the COM and is likely to lead to customer dissatisfaction due to long restart times. In addition, it increase wear of the starter motor and reduces fuel economy due to the need to recharge the battery used to power the starter motor more frequently.

It is an object of this description to provide an improved method for dealing with a Change of Mind Event during the shut-down and restart of an engine. It is a second object to overcome resonance of a dual mass flywheel.

According to a first aspect of the description there is provided a method for controlling an engine following an automatic engine shut-down request comprising determining whether a change of mind has occurred and, if a change of mind has occurred, preventing the restarting of the engine if the rotational speed of the engine is within a predetermined speed range in which resonance of an engine related component occurs.

The engine may have a dual mass flywheel and the engine related component may be the dual mass flywheel. The method may further comprise restarting the engine when the engine speed falls below the predetermined speed range. The method may further comprise preparing the engine for the restart while it is in the predetermined speed range. Preparing for the restart may comprise opening a throttle valve of the engine so as to admit air to the engine. Preparing for the restart may comprise reducing from a normal level to a lower level, one or more auxiliary load applied to the engine. The or each auxiliary load may be a load from an accessory device driven by the engine. The method may further comprise returning to the normal level the or each auxiliary load after the engine speed has risen to a speed above the predetermined speed range following the restart of the engine.

According to a second aspect of the description there is provided a system for controlling the operation of an engine following an automatic shut-down request wherein the system includes an electronic control unit arranged in response to the automatic engine shut-down request to shut-down the engine, determine whether a change of mind has occurred and, if a change of mind has occurred, prevent the restarting of the engine if the rotational speed of the engine is within a predetermined speed range in which resonance of at least one engine related component occurs.

The engine may have a dual mass flywheel and the at least one engine related component may be the dual mass flywheel. The electronic control unit may be further arranged to restart the engine when the engine speed falls below the predetermined speed range. The electronic control unit may be further operable to prepare the engine for the restart while the speed of the engine is in the predetermined speed range. The system may further include a throttle valve controlled by the electronic control unit and the electronic control unit may prepare for the restart by opening the throttle valve of the engine so as to admit air to the engine. The electronic control unit may prepare for the restart by reducing from a normal level to a lower level, one or more auxiliary load applied to the engine. The or each auxiliary load may be a load from an accessory device driven by the engine. The electronic control unit may be further operable to return to the normal level the or each auxiliary load after the engine speed has risen to a speed above the predetermined speed range following the restart.

According to a third aspect of the description there is provided a motor vehicle having a system for controlling the operation of an engine following an automatic shut-down request constructed in accordance with said second aspect of the description.

The present description may provide several advantages. Specifically, the approach may reduce engine noise and vibration. Additionally, the approach may reduce engine emissions by limiting engine restarting to conditions that are suitable for lower emission restarts.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example, referred to herein as the Detailed Description, when taken alone or with reference to the drawings, where.

DETAILED DESCRIPTION

Figure 1:
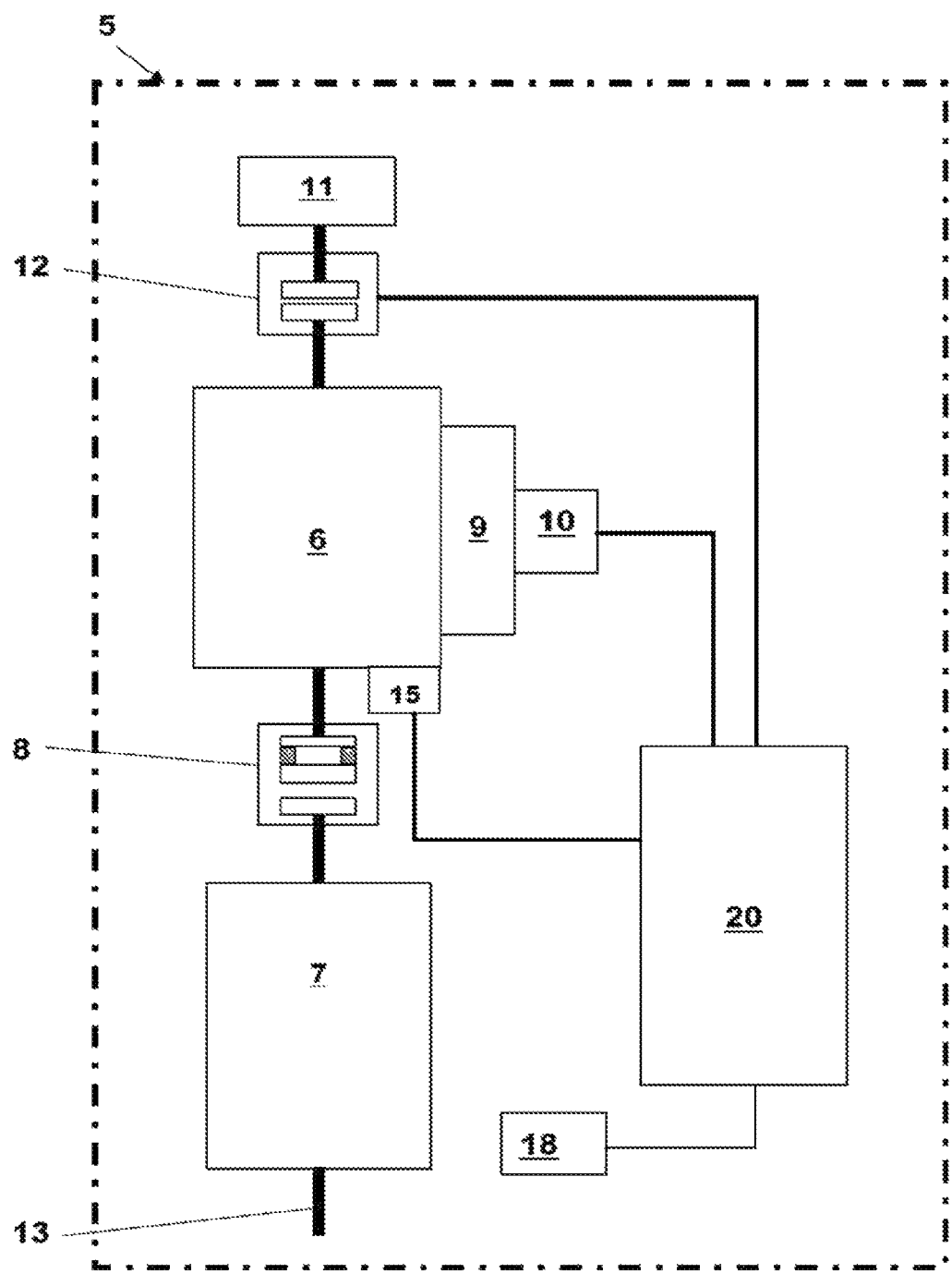
FIG. 1 is a block diagram of a motor vehicle having an engine control system according to one aspect of the description.

The present description is related to controlling an engine that may be automatically stopped and started. In one non-limiting example, the engine may be configured as illustrated in FIG. 1. Engine stopping and starting may be performed according to the method described by FIG. 2. The method of FIG. 2 may be used to control an engine as shown in FIGS. 3 and 4.

Referring to FIG. 1 there is shown a motor vehicle 5 having an internal combustion engine 6 which in this case is a direct injection spark ignited engine. The engine 6 has an inlet manifold 9 through which air flows to the cylinders (not shown) of the engine 6. The flow of air into the manifold 9 is controlled by a throttle valve 10. Exhaust gases flow out of the engine 6 via an exhaust manifold and an exhaust system (not shown) which may include one or more emission control devices.

The engine 6 drives a primary load in the form of a multi-speed gearbox 7 via a dual mass flywheel and clutch assembly 8 and the gearbox drives a final drive assembly (not shown) via an output shaft 13.

The engine 6 also drives numerous auxiliary loads in the form of accessory devices 11 via a clutch 12. The accessory devices 11 may include a water pump, an electric generator such as an alternator, a power steering pump, an air-conditioning pump and other devices requiring a source of motive power.

The motor vehicle 5 also includes an electronic control unit 20 forming part of an engine control system used to control the operation of the engine 6. The electronic control unit 20 receives information from a number of sensors 15 regarding the current operating state of the engine 6 such as for example, the rotational speed of the engine 6 and the mass air flow into the engine 6 and may also receive other information regarding, for example the state of charge of a battery (not shown) used to power a starter motor (not shown) for the engine 6. The electronic control unit 20 also receives information from one or more sensors 18 regarding the current operating state of various driver controlled devices such as, for example and without limitation, sensors 18 may include one or more of the following sensors: the position of a clutch pedal, the engagement state of a clutch, a transmission/gearbox engagement state, brake pedal state, accelerator pedal state from which it is determined whether an automatic engine stop is required to save fuel.

The electronic control unit 20 controls the opening and closing of the throttle valve 10 via a closed loop feedback system formed as part of the control unit 20 and also controls the engagement and disengagement of the clutch 12 and the stopping and starting of the engine 6.

Operation of the engine control system is as follows when the electronic control unit (ECU) 20 decides that the engine 6 is to be automatically stopped it takes the appropriate action to stop the engine 6 and continuously monitors the current rotational speed of the engine 6. If a COM event occurs, the ECU 20 responds in different ways depending upon the current speed (N) of the engine 6.

It will be appreciated that the engine 6 can be stopped in several ways in which the torque is reduced sufficiently to produce an engine stop, these include, cutting the fuel supply to the engine 6, cutting an ignition system in the case of a spark ignited engine adjusting spark timing, modulating the ignition, adjusting injection timing, modulating fuel injection and switching off fuel injectors.

A COM event is an event where the actions of the driver have indicated that the engine 6 needs to be automatically stopped or shut-down but then during the shut-down of the engine 6 the driver performs some action which indicates that the engine 6 should be kept running. For example, in the case of a manual transmission, if the driver has removed their foot from the accelerator pedal, depressed a clutch pedal and placed the transmission into neutral and then during the shut-down the transmission is placed back into gear this could be used to indicate a COM. It will be appreciated that an automatic transmission can also be subject to a COM event and that the description is not limited to use with a manual transmission. For example, a COM for a vehicle with an automatic transmission may be as simple as the operator releasing a brake pedal.

In response to a COM event, the ECU 20 checks the current engine speed (N) and, if it is found to be within a resonance region defined by an upper speed limit ($N_{UL}$) and a lower speed limit ($N_{LL}$), then restarting of the engine 6 is prevented but the engine 6 is prepared for a restart as soon as the engine speed (N) is no longer within the resonance region bounded by $N_{UL}$ and $N_{LL}$. The upper and lower bounds $N_{UL}$ and $N_{LL}$ of the resonance region will depend upon the actual construction and dimensions of the DMF but in one example the upper speed boundary $N_{UL}$ is 600 RPM and the lower speed boundary $N_{LL}$ is 450 RPM. These values are stored in the ECU 20 as predetermined values for use by the ECU 20 in determining whether the current engine speed (N) is within the resonance region.

Preparing the engine 6 for a restart includes in this case sending a command/signal to open the throttle valve 10 so that the pressure in the inlet manifold 9 is allowed to rise to a higher pressure, that is to say a pressure nearer to atmospheric. This can be seen in FIG. 4 (point s') where the pressure is closer to atmospheric pressure (AP) at the point in time (ES on FIG. 3) where the engine 6 starts.

Preparing the engine 6 for a restart also includes in this case removing where possible any additional or auxiliary loads from the engine 6 such as the load imposed by the accessory devices 11. In other examples, the ancillary loads may not be removed from the engine but it may be advantageous to remove these loads. In the example shown in FIG. 3, the removal of the auxiliary loads is done by sending a command from the ECU 20 to the clutch 12 to disengage the clutch 12. During the time when the clutch 12 is disengaged the accessory devices 11 may be driven by an alternative means as is known from, for example, UK Patent publication GB-A-2435302. It will however be appreciated that the load imposed upon the engine 6 by the ancillary devices may be effected in another manner and that the description is not limited to an example in which all of the ancillary devices are driven off the engine 6 via a common clutch. For example, in the case of an alternator, the electrical load on the alternator could be switched off and in the case of a pump or compressor the device may have its own electronically controlled clutch that can be disengaged or the load applied to that pump or compressor could be reduced.

By preparing for a restart during the period where restarting is prevented, time is saved as soon as the engine speed (N) is no longer in the resonance region, that is to say, when the engine speed falls below $N_{LL}$ the engine can be restarted by enabling the functionality of the engine required to produce starting such as switching on a fuel supply to the engine 6. The engine 6 will then restart automatically via enabling spark and fuel delivery without the use of a starter motor because the rotational speed of the engine 6 is sufficiently high.

In some cases the ignition may remain activated and unaltered during an automatic stop and only the fuel is cut or altered to produce a stop and re-supplied to produce a restart and in other cases both the fuel and ignition are cut or adjusted to produce a stop. Furthermore, it will be appreciated that when the description is applied to a diesel engine it is the fuel supply that is used to control stopping and starting of the engine. The actual mechanisms used to produce an engine stop are not important and the description is not limited to a particular engine stop mechanism.

It will be appreciated that the actual timing of the restart will depend upon when during the time spent in the resonance region the COM event occurs. For example, if the COM event occurs just after the engine speed has fallen into the resonance region then there will be sufficient time for the throttle valve 10 to be opened and the cylinders filled with fresh air and so restarting can occur as soon as the engine speed falls below $N_{LL}$ but, if the COM occurs very close to the lower speed limit $N_{LL}$ then there may be insufficient time for the engine 6 to be filled with fresh air and for the ancillary loads 11 to be removed and so there might be a short delay in order to ensure that when restarting occurs it occurs with the most favorable conditions so that the engine 6 can accelerate smoothly and quickly through the resonance region.

In this way, resonance of the dual mass flywheel 8 is avoided and the engine 6 is restarted as soon as possible. In addition, the high torque levels of the combustion will immediately accelerate the engine 6 through the DMF resonance region resulting in a successful and fast engine restart.

By opening the throttle valve during the preparation period:
1) increased manifold pressure is provided to enable the engine to fire with high torque when the fuel is enabled; and
2) a flow of clean air is provided to the engine 6 thereby ensuring that the combustion chambers of the engine 6 contain as much oxygen as possible.

By removing the auxiliary loads from the engine 6 during the preparation period, the deceleration of the engine is reduced which assists with targeting the right engine speed for the restart attempt and when the engine 6 is restarted it can accelerate more quickly through the DMF resonance region. The reduced deceleration can be clearly seen on FIG. 4 by comparing the slope of the line 5' prior to the engine restart (ES) with the slope of the adjacent line 2 where the auxiliary loads are still present and the throttle valve 10 is closed. After the engine 6 is running again, the control of the throttle valve 10 reverts to a normal control strategy required to provide the torque demanded by a user of the engine 6. Any auxiliary loads removed during the preparation period are not re-applied until the engine speed (N) is above the upper speed limit $N_{UL}$ of the DMF resonance region.

If the COM occurs when the current engine speed (N) is above the resonance region upper limit $N_{UL}$ then it is restarted as previously known and described above using the residual rotational speed/inertia of the engine 6. If the COM occurs when the engine speed is below a lower speed limit $C_L$, corresponding to a rotational speed below which a successful restart is unlikely to occur, then as previously known and described above, the engine 6 must be stopped before restarting it by cranking it using an external starter device such as a starter motor.

Thus, the system of FIG. 1 provides for a system for controlling the operation of an engine following an automatic engine shut-down request, comprising: an engine; an engine related component; and an electronic control unit including instructions stored in a non-transitory medium to prevent restarting of the engine after an automatic engine shut-down request in response to an operator change of mind when a rotational speed of the engine is within a predetermined speed range in which resonance of the engine related component occurs. The system includes where the engine has a dual mass flywheel and the engine related component is the dual mass flywheel. In this way, engine vibration may be reduced.

The system of FIG. 1 also includes where the electronic control unit includes additional instructions to restart the engine when the rotational speed of the engine falls below the predetermined speed range. The system also includes where the electronic control unit includes further instructions to prepare the engine for a restart while the rotational speed of the engine is in the predetermined speed range. The system further comprises a throttle valve controlled by the electronic control unit, and where the electronic control unit includes additional instructions to restart the engine by opening the throttle valve so as to admit air to the engine. The system also includes where the electronic control unit includes additional instructions for the restart by reducing from a normal level to a lower level, one or more auxiliary load applied to the engine. In some examples, the system includes where the one or more auxiliary load is a load from an accessory device driven by the engine. The system also includes where the electronic control unit includes additional instructions to return to the normal level the one or more auxiliary load after the rotational speed of the engine has risen to a speed above the predetermined speed range following the restart.

Figure 2:
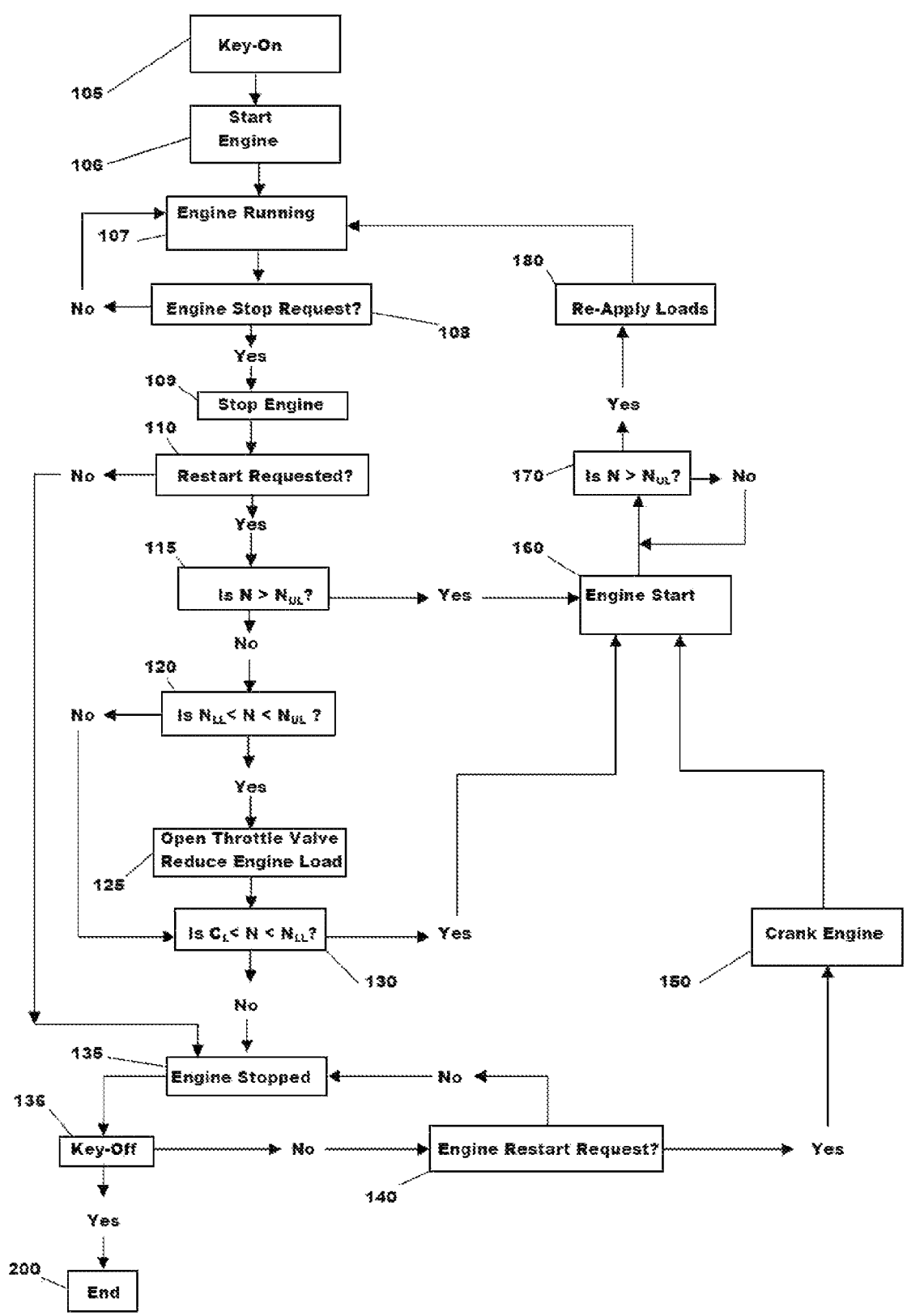
FIG. 2 is a high level flow chart of a method for controlling the shut-down and restarting of an engine in the case of a Change of Mind Event.
Figure 3:
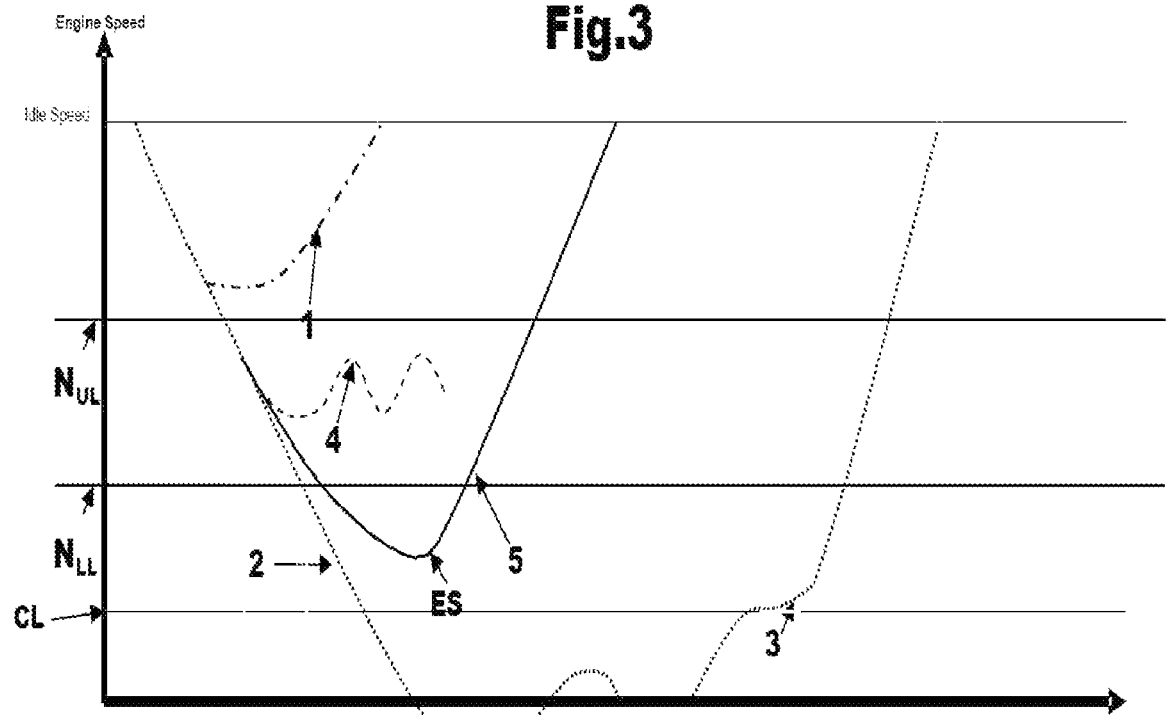
FIG. 3 is a chart showing various relationships between engine speed and time including a Change of Mind interrupted shut-down and restart according to the description.
Figure 4:
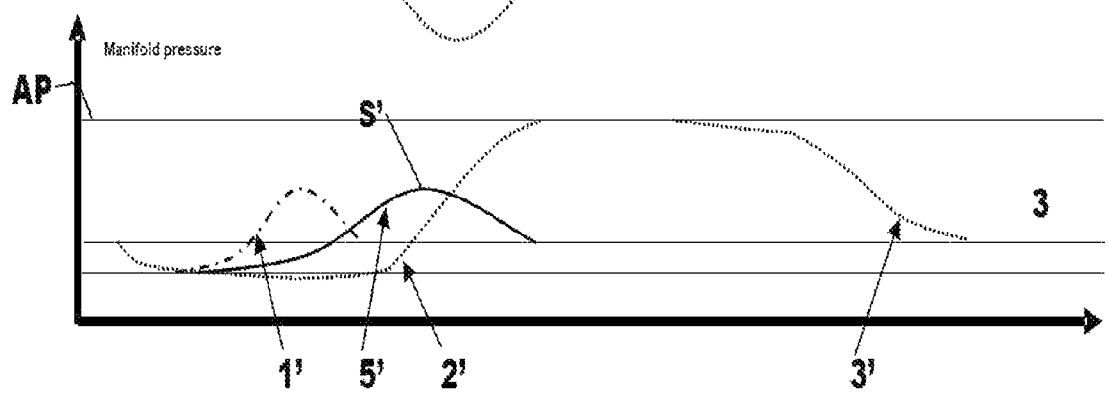
FIG. 4 is a chart showing manifold pressure versus time for the shut-downs and restarts shown in FIG. 3.

Referring now to FIGS. 2 to 4 a method for controlling the engine 6 in the event of a COM embedded as an executable program in the ECU 20 will be described in greater detail.

The method starts at step 105 which in the case of a motor vehicle 5 fitted with the engine 6 is a Key-On event. Step 105 is followed by a driver initiated engine start at step 106 and resulting in a running engine as indicated in step 107. Step 106 will include the steps of cranking the engine 6 with a starting device, opening the throttle valve 10 and providing spark and fuel to the engine 6.

In step 108, it is determined using the various sensor inputs 18 whether an automatic engine stop is requested by a stop-start controller which is formed as part of the ECU 20 but may alternatively be a separate unit. If no stop has been requested, then the method loops back to step 107 and rechecks once again whether a stop request exists but if a stop has been requested the method advances to step 109 and an engine shut-down commences. In the case of the engine 6 currently being described, the engine shut-down comprises of cutting or modulating the fuelling of the engine 6 and closing the throttle valve 10. However, as discussed above, in other examples, the ignition may also be switched off or modulated/altered and the throttle valve closed.

Then in step 110, it is determined whether a COM event has occurred indicating that a restart is requested, if no such COM event has occurred then the shut-down continues until eventually the engine is stopped, as indicated in step 135. It will be appreciated that, although not specifically shown on FIG. 2 the method provides for the continuous rechecking as to whether a restart has been requested until the engine 6 is actually stopped as indicated in step 135. If at any time during this engine shut-down period there is a request for a restart, then instead of proceeding to step 135 the method will return to step 115 and continue from there.

However, if in step 110 it is determined that a COM event has occurred, then in step 115, it is determined whether the current engine speed (N) is above the upper limit of the resonance region by comparing the current engine speed with the predetermined upper limit of the resonance region $N_{UL}$ using the test Is $N > N_{UL}$. If the answer is 'Yes,' then the method advances to step 160, and if the answer is 'No,' the method advances to step 120.

Dealing firstly with a 'Yes' result from step 115, the engine is restarted in step 160 this corresponds to the line 1 on FIGS. 3 and 1' on FIG. 4. The restarting of the engine will in this case involve opening the throttle valve 10 and switching on or re-enabling the supply of fuel to the engine 6.

If the result from step 115 is 'No,' then in step 120 it is determined whether the current speed (N) of the engine 6 falls within the resonance region by comparing it with predetermined upper and lower resonance region speed limits $N_{UL}$ and $N_{LL}$ using the test Is $N_{LL} < N < N_{UL}$.

If the result of the test in step 120 is 'No,' the method advances to step 130, and if the answer is 'Yes,' the method advances to step 125 and then moves on to step 130.

Dealing firstly with a 'Yes' result from step 120, in step 125 according to the description, the throttle valve 10 is opened thereby allowing the manifold pressure to rise and admitting fresh air into the cylinders of the engine 6 and any auxiliary loads that can be removed from the engine 6 are removed but no attempt is made to restart the engine 6. That is to say, while the engine speed (N) is within the resonance region, preparations for a restart are made but no attempt to restart is made. In one example, the throttle opening amount is adjusted in response to engine speed and barometric pressure. For example, as engine speed decreases, the throttle opening amount may increase. And, as barometric pressure decreases, the throttle opening amount may be increased. In this way, the throttle may be adjusted to provide more engine torque at lower engine speeds to accelerate the engine back to idle speed. Further, the adjustments to throttle position that are based on barometric pressure help to ensure equivalent engine torque is provided for different barometric pressures. The throttle position adjustments may be empirically determined and stored in non-transitory controller memory.

If a 'No' result is produced by the test in step 120 or the preparations required in step 125 have been completed, then in step 130 it is determined whether the current engine speed (N) is between the lower speed limit of the resonance region $N_{LL}$ and a cranking limit $C_L$. The cranking limit $C_L$ is a speed below which restarting of the engine 6 without the use of a starter motor is unlikely to produce a successful start. That is to say, because it takes a finite amount of time to get fuel, air and spark scheduled, $C_L$ is a speed below which there is insufficient time to schedule these events in order to obtain a robust restart.

Dealing firstly with a 'No' result from the test in step 130, the method advances to step 135 where the engine is stopped. However, it will be appreciated that this is only likely to result if the route to step 130 is from step 120 because if the route to step 130 is from step 125 then as soon as the engine speed (N) falls below $N_{LL}$ the result will be 'Yes' in step 130. A 'No' result will only be produced following step 125 if the engine 6 has stalled during the performance of step 125.

Referring back to step 135, the engine 6 is stopped and the method then advances to check whether a Key-off event has occurred in step 136, if it has the method advances to step 200 and the method ends and, if it has not the method advances to step 140. In step 140, it is determined whether the engine 6 is to be restarted; this is the same process as for a conventional restart of a stop-start controlled engine. That is to say, the ECU 20 determines whether a restart is indicated by the actions of the driver using the input from the sensors 18 and if a restart is indicated to be required, the ECU 20 restarts the engine by in this case advancing the method firstly to step 150 and then on to step 160. It will be appreciated that the throttle valve 10 will be opened as part of this restarting process and that the auxiliary loads could if desired be removed as there is sufficient time to do so.

If at step 140 an engine restart has not been requested, the method loops around the steps 135, 136 and 140 until either a Key-off event occurs at step 136 in which case the method ends at step 200 or the test in step 140 is passed and the method advances to step 150.

In step 150, the engine 6 is cranked by a starter motor and then proceeds to step 160 where the engine is restarted by opening the throttle valve 10 and switching on or re-enabling the fuel supply. It will be appreciated that these events do not occur instantaneously and that various delays and timing issues need to be taken into account as is normally the case when an engine is started.

Referring back now to step 130, if a 'Yes' result is obtained from step 130 following step 125 the method advances to step 160 where an engine start or restart occurs. The engine 6 is restarted in this case using the remaining rotational speed/inertia of the engine 6 and no external starter motor assistance is required by switching on or re-enabling the fuel supply to the engine 6. It will be appreciated that in this case the engine 6 has already been prepared for a restart in step 125 and so the throttle valve 10 is already open and fresh air will have been admitted to the cylinders of the engine 6 ensuring a very positive start. In addition, because the auxiliary loads have been removed in step 125, the engine 6 will, once started accelerate rapidly as it does not also have to accelerate the loads/inertia associated with the ancillary devices 11. However, as before, these events do not occur instantaneously and various delays and timing issues need to be taken into account as is normally the case when an engine is started.

If a 'Yes' result is obtained from step 130 following step 120 the method will as described above advance to step 160 where an engine start or restart occurs as previously described but in this case the throttle valve 10 will need to be opened as part of the engine restart and in some cases the auxiliary loads are removed which will result in a delay in the restart procedure.

From step 160 the method advances to step 170 where it is determined whether the current engine speed (N) is above the upper speed limit of the resonance region $N_{UL}$ and if it is the method advances to step 180 but if it is not loops back to step 170 to recheck the engine speed (N) until a positive result is produced. In practice, it is preferred to use a slightly higher limit for this test in order to guarantee that the result is well clear of the resonance region so that, for example, if $N_{UL}$=600 RPM the test in step 170 may be Is N>700 RPM.

In step 180 any auxiliary loads that have been removed are re-applied and the method returns to step 107 with the engine 6 running normally and with normal control of the throttle valve 10 to produce driver demanded torque.

It will be appreciated that the method described above and shown in FIG. 2 is given by way of example and that the description is not limited to the exact steps shown or to the order or logic employed.

Therefore in summary, a method for controlling an engine following a change of mind event is provided that effectively eliminates the risk of resonance of a dual mass flywheel during the restart by preventing restarting during a predetermined resonance region, preparing for the restart during the time that the engine remains within the resonance region by opening the throttle valve so that the manifold pressure returns to near atmospheric pressure to ensure enough torque will be generated when the engine is restarted to smoothly and rapidly accelerate the engine through the resonance region and then restarting the engine using its own momentum as soon as the speed of the engine falls sufficiently below the resonance region to enable the smooth positive acceleration required.

Preferably, any auxiliary loads on the engine are removed during the time delay while the engine transits through the resonance region so as to further promote rapid acceleration of the engine when it is restarted.

Although the description has been described so far in relation to a particularly advantageous use in respect of an engine having a dual mass flywheel, it will be appreciated that it is not limited to such use and could be applied with advantageous effect to other engine applications where one or more engine related components resonate during a particular speed range of the engine. For example, the description could be applied to reducing engine mount shake or resonance of any other engine related component that is excited into resonance due to torsional oscillation of the engine during a shut-down and consequential restart due to a COM.

In this way, excessive resonance is reduced or eliminated by preventing the restarting of the engine 6 while its rotational speed falls within a predetermined speed range that encompasses the speed range where resonance is most likely to occur. A further advantageous aspect of the invention is that a throttle valve 10 is opened during the period when restarting is prevented so that the engine 6 is ready to be restarted in a favorable manner as soon as the speed falls below the predetermined speed range. In a preferred example one or more ancillary loads 10 applied to the engine 6 are removed during the period when restarting is prevented thereby allowing the engine 6 to accelerate strongly through the predetermined speed range when it is restarted.

Thus, the method of FIG. 2 provides for a method for controlling an engine following an automatic engine shut-down request comprising: preventing restarting of an engine after starting to automatically stop the engine in response to an operator change of mind to restart the engine when a rotational speed of the engine is within a predetermined speed range in which resonance of an engine related component occurs. The method includes where the engine has a dual mass flywheel and the engine related component is the dual mass flywheel. In this way, objectionable engine noise and vibration may be reduced.

In some examples, the method further comprises restarting the engine when the rotational speed of the engine falls below the predetermined speed range. The method further comprises preparing the engine for a restart while the engine is in the predetermined speed range. The method includes where preparing the engine for the restart comprises opening a throttle valve of the engine so as to admit air to the engine. The method also includes where preparing the engine for the restart comprises reducing from a normal level to a lower level, one or more auxiliary load applied to the engine. The method also includes where the one or more auxiliary load is a load from an accessory device driven by the engine. The method further comprises returning to the normal level the one or more auxiliary load after engine speed has risen to a speed above the predetermined speed range following the restart of the engine.

The method of FIG. 2 also includes a method for controlling an engine following an automatic engine shut-down request comprising: preventing restarting of an engine after starting to automatically stop the engine in response to an operator change of mind to restart the engine when a rotational speed of the engine is within a predetermined speed range in which resonance of an engine related component occurs; and adjusting a throttle to a position based on engine speed in response to an operator change of mind while the rotational speed of the engine is within the predetermined speed range. The method includes where adjusting the throttle includes increasing an opening amount of the throttle as engine speed decreases. The method also includes where the adjusting the throttle includes adjusting a position of the throttle in response to barometric pressure.

As will be appreciated by one of ordinary skill in the art, routines described in FIG. 2 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for controlling an engine following an automatic engine shut-down request comprising:
   after starting to automatically stop the engine, in response to an operator change of mind to restart the engine,
   preventing restarting of the engine when a rotational speed of the engine is within a predetermined speed range in which resonance of an engine related component causing vibration of the engine related component occurs, and
   preparing the engine for a restart while the engine is in the predetermined speed range by removing one or more auxiliary loads applied to the engine via disengagement of a clutch, the clutch coupling the one or more auxiliary loads with an engine output shaft when engaged.

2. The method of claim 1, where the engine has a dual mass flywheel and the engine related component is the dual mass flywheel.

3. The method of claim 2, where the method further comprises restarting the engine when the rotational speed of the engine falls below the predetermined speed range.

4. The method of claim 3, wherein restarting the engine when the rotational speed of the engine falls below the predetermined speed range comprises:
   if the rotational speed of the engine is below a cranking limit, stopping the engine and then cranking the engine with a starter motor to start the engine; and
   if the rotational speed of the engine is not below the cranking limit, restarting the engine using its own momentum with no assistance from the starter motor by enabling spark and fuel delivery.

5. The method of claim 1, where preparing the engine for the restart further comprises increasing opening of a throttle valve of the engine as engine speed decreases.

6. The method of claim 1, where the one or more auxiliary loads include a load from an accessory device driven by the engine via the engine output shaft when the clutch is engaged.

7. The method of claim 1, where the method further comprises coupling the clutch with the engine output shaft to re-apply the one or more auxiliary loads to the engine after engine speed has risen to a speed above the predetermined speed range following the restart of the engine.

8. A system for controlling operation of an engine following an automatic engine shut-down request, comprising:
   an engine including an engine output shaft;
   an engine related component;
   a throttle valve;
   a clutch coupling the engine output shaft with one or more auxiliary loads when engaged; and
   an electronic control unit including instructions stored in a non-transitory medium to
      prevent restarting of the engine after an automatic engine shut-down request in response to an operator change of mind when a rotational speed of the engine is within a predetermined speed range in which resonance of the engine related component causing vibration of the engine related component occurs,
      prepare the engine for a restart while the rotational speed of the engine is in the predetermined speed range by removing the one or more auxiliary loads applied to the engine via disengagement of the clutch, and
      restart the engine using its own momentum with no starter motor assistance by enabling spark and fuel delivery when the rotational speed of the engine is less than the predetermined speed range and greater than a cranking limit.

9. The system of claim 8, where the engine has a dual mass flywheel and the engine related component is the dual mass flywheel.

10. The system of claim 8, wherein the throttle valve is controlled by the electronic control unit, and where the instructions to prepare the engine for a restart while the rotational speed of the engine is in the predetermined speed range include instructions to increase opening of the throttle valve as engine speed decreases.

11. The system of claim 8, where the one or more auxiliary loads include a load from an accessory device driven by the engine via the engine output shaft when the clutch is engaged.

12. The system of claim 11, where the electronic control unit includes additional instructions to couple the clutch with the engine output shaft to re-apply the one or more auxiliary loads to the engine after the rotational speed of the engine has risen to a speed above the predetermined speed range following the restart.

13. The system of claim 12, further comprising a motor vehicle which includes the engine.

14. A method for controlling an engine following an automatic engine shut-down request comprising:
   preventing restarting of an engine after starting to automatically stop the engine in response to an operator change of mind to restart the engine and when a rotational speed of the engine is within a predetermined speed range in which resonance of an engine related component causing vibration of the engine related component occurs;
   adjusting a throttle to a position based on engine speed in response to the operator change of mind while the rotational speed of the engine is within the predetermined speed range, where adjusting the throttle includes increasing an opening amount of the throttle as engine speed decreases; and
   preparing the engine for a restart while the engine is in the predetermined speed range by removing one or more auxiliary loads applied to the engine via disengagement of a clutch, the clutch coupling the one or more auxiliary loads with an engine output shaft when engaged.

15. The method of claim 14, where adjusting the throttle further includes adjusting a position of the throttle in response to barometric pressure.

* * * * *